(12) United States Patent
Klein et al.

(10) Patent No.: US 7,514,141 B2
(45) Date of Patent: Apr. 7, 2009

(54) POLYESTER FILM WITH LOW MECHANICAL STRENGTH

(75) Inventors: Oliver Klein, Ockenheim (DE); Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 11/695,678

(22) Filed: Apr. 3, 2007

(65) Prior Publication Data

US 2007/0237950 A1    Oct. 11, 2007

(30) Foreign Application Priority Data

Apr. 8, 2006  (DE)  ........................ 10 2006 016 634
Apr. 8, 2006  (DE)  ........................ 10 2006 016 635

(51) Int. Cl.
  B32B 27/08   (2006.01)
  B32B 27/18   (2006.01)
  B32B 27/36   (2006.01)
  B32B 37/15   (2006.01)
  B32B 38/00   (2006.01)

(52) U.S. Cl. .................. 428/349; 428/480; 428/910; 428/346; 428/347; 264/173.11; 264/173.12; 264/173.13; 264/173.16; 264/288.4; 264/290.2; 528/302; 528/307; 528/308; 528/308.6; 528/308.7

(58) Field of Classification Search ............... None
See application file for complete search history.

(56) References Cited

U.S. PATENT DOCUMENTS

| | | | | |
|---|---|---|---|---|
| 4,659,615 A * | 4/1987 | Ishii et al. | .................... | 428/220 |
| 5,071,690 A * | 12/1991 | Fukuda et al. | ............... | 428/141 |
| 5,324,794 A * | 6/1994 | Taka et al. | ............. | 525/440.13 |
| 5,747,174 A * | 5/1998 | Kimura et al. | ............... | 428/480 |
| 5,955,181 A * | 9/1999 | Peiffer et al. | ................. | 428/212 |
| 6,071,599 A * | 6/2000 | Kosuge et al. | .............. | 428/213 |
| 6,149,995 A * | 11/2000 | Peiffer et al. | ................ | 428/35.8 |
| 6,368,710 B1 * | 4/2002 | Hayes | .......................... | 428/364 |
| 6,391,410 B1 * | 5/2002 | Peiffer et al. | ................ | 428/35.7 |
| 6,485,819 B2 * | 11/2002 | Hayes | .......................... | 428/221 |
| 6,537,647 B2 * | 3/2003 | Peiffer et al. | ................. | 428/141 |
| 6,703,115 B2 * | 3/2004 | Hale et al. | ................... | 428/212 |
| 6,787,245 B1 * | 9/2004 | Hayes | .......................... | 428/480 |
| 7,211,306 B2 * | 5/2007 | Peiffer et al. | ................ | 428/34.9 |
| 7,220,815 B2 * | 5/2007 | Hayes | .......................... | 528/272 |
| 2004/0163987 A1 * | 8/2004 | Allen | ........................... | 206/438 |
| 2005/0019189 A1 * | 1/2005 | Lee et al. | ........................ | 418/23 |
| 2005/0042439 A1 * | 2/2005 | Peiffer et al. | ................. | 428/323 |
| 2005/0069688 A1 * | 3/2005 | Kliesch et al. | .............. | 428/220 |
| 2005/0164022 A1 * | 7/2005 | Kliesch et al. | ............ | 428/474.4 |
| 2005/0208291 A1 * | 9/2005 | Kaufman et al. | ............ | 428/323 |
| 2005/0214526 A1 * | 9/2005 | Klein et al. | ................. | 428/328 |
| 2005/0249906 A1 * | 11/2005 | Sankey et al. | .............. | 428/35.7 |
| 2005/0288452 A1 * | 12/2005 | Wakaki et al. | .............. | 525/450 |
| 2006/0155100 A1 * | 7/2006 | Aoshima et al. | ............ | 528/272 |

FOREIGN PATENT DOCUMENTS

| | | | |
|---|---|---|---|
| EP | 0 035 835 A1 | | 9/1981 |
| EP | 0 415 383 A2 | | 3/1991 |
| EP | 0 515 096 A2 | | 11/1992 |
| EP | 0 612 790 A2 | | 8/1994 |
| EP | 1 138 480 A | | 10/2001 |
| EP | 1 453 895 A | | 9/2004 |
| EP | 1 529 797 A | | 5/2005 |
| JP | 06-145314 | * | 5/1994 |
| JP | 06-198732 | * | 7/1994 |
| JP | 07-024985 | * | 10/1995 |
| JP | 2000094473 | | 4/2000 |
| JP | 2004202702 | | 7/2004 |

OTHER PUBLICATIONS

Schimtz, Peter et al., "Films." Ullmann's Encyclopedia of Industrial Chemistry, 5th Ed., vol. A11 (1988), pp. 85-110.*

* cited by examiner

*Primary Examiner*—Vivian Chen
(74) *Attorney, Agent, or Firm*—ProPat, L.L.C.

(57) ABSTRACT

The invention relates to a biaxially oriented polyester film having a base layer (B) which comprises at least 80% by weight of a polyester comprised of from 55 to 90 mol % of units deriving from at least two aromatic dicarboxylic acids and of from 5 to 45 mol % of units deriving from at least one aliphatic dicarboxylic acid, where the total of the dicarboxylic-acid-derived molar percentages is 100. The film features ultimate tensile strength of $\leq 100$ N/mm$^2$ and modulus of elasticity of $\leq 3000$ N/mm$^2$.

23 Claims, No Drawings

POLYESTER FILM WITH LOW MECHANICAL STRENGTH

CROSS-REFERENCE TO RELATED APPLICATIONS

This application claims priority to German Patent Applications 10 2006 016 635.3 filed Apr. 8, 2006 and German Patent Applications 10 2006 016 634.5 filed Apr. 8, 2006 both of which are hereby incorporated herein by reference in their entirety.

FIELD OF THE INVENTION

The invention relates to a transparent, biaxially oriented polyester film with a base layer (B) which comprises at least one aliphatic polyester. This gives the biaxially oriented polyester film low mechanical strength with a desired feel. In one particular embodiment, the film comprises a heat-sealable outer layer (A) arranged on the base layer (B). The invention further relates to a process for the production of these films and to their use.

BACKGROUND OF THE INVENTION

Transparent, biaxially oriented polyester films featuring a reduced level of mechanical properties (lower strengths, lower moduli) are known in the prior art. In most cases, the films acquire their altered properties via use of aromatic polyesters other than standard polyethylene terephthalate. Examples of these are the widely used glycol-modified aromatic polyesters, e.g. polybutylene terephthalate (PBT) or polytrimethylene terephthalate (PTT). As an alternative to this, there are known aromatic polyesters whose modification relates to the acid component: polyethylene isophthalate (IPA).

An example here is provided by JP 2000094473, which describes use of a polyester film with greater than or equal to 80% by weight of PTT, and which achieves a modulus of elasticity of less than or equal to 5884 N/mm$^2$. The film features good formability and can by way of example be used as transfer film. The disadvantage of said film is that the raw materials used do not permit achievement of the desired low mechanical strengths.

JP 2004202702 describes a further example. An aim of the invention is to produce a film that tears easily. This is achieved firstly via use of polyesters (blends and copolymers) in the base layer of the film whose melting points are lower by at least 10° C. than the melting points of the polyesters in the outer layers, and secondly via selection of certain parameters in heat-setting. Again, said films, the base layer of which is produced in the examples from blends or, respectively, copolymers of PET with IPA or PBT, cannot achieve the desired low mechanical strength.

EP-A-0 415 383 provides a further example here, and describes the use of a polyester film whose melting point is from 210 to 245° C., whose planar orientation is from 0.10 to 0.16, whose shrinkage is smaller than or equal to 10%, and whose density is less than 1.385 g/cm$^3$. The film features good formability and good adhesion to metal and is intended by way of example for use in lamination of cans. A disadvantage is that the polyesters used do not sufficiently reduce the strength and crystallinity of the film, the reduction in stiffness of the film therefore being insufficient.

EP-A-1 453 895 provides a further example and claims a biaxially oriented polyester film whose glass transition temperature is greater than or equal to 60° C. and whose density is smaller than or equal to 1.38 g/cm$^3$ and whose dead-fold retainability is at least 60%. A disadvantage is that the polyesters used do not sufficiently reduce the strength of the film, the reduction in level of mechanical properties of the film therefore being insufficient.

EP-A-0 612 790 describes a transparent, biaxially oriented polyester film which comprises a particle system comprised of crosslinked polymers. The film is characterized by planar orientation Δp which is greater than 0.14. All of the films listed in the examples have planar orientation Δp of 0.17. By virtue of the planar orientation Δp of 0.17 cited in the examples, said films again cannot achieve the desired low mechanical strengths.

Heat-sealable, biaxially oriented polyester films are also known in the prior art.

EP-A-0 035 835 describes a heat-sealable polyester film to which particles are added in the sealable layer in order to improve winding performance, the average size of the particles exceeding the thickness of the sealable layer. The particulate materials added form surface protrusions which inhibit undesired blocking and adhesion of the film to rolls or guides. The selection of particles with diameter greater than the thickness of the sealable layer and with the concentrations cited in the examples impairs the seal performance of the film. The seal seam is produced at 140° C. and seal seam strength is determined at 23° C., and is in the range from 63 to 120 N/m (corresponding to from 0.97 to 1.8 N/15 mm of film width). The biaxially oriented polyester film does not have the low mechanical strength demanded with the desired feel and with good formability.

EP-A-0 515 096 describes a heat-sealable polyester film which has an additional additive on the sealable layer. The additive can by way of example comprise inorganic particles and is preferably applied in the form of an aqueous layer to the film during its production. The intention is thereby to retain the good sealing properties while the film has good processability. Said specification does not cite the sealing temperature range of the film. The seal seam is produced at 140° C. and seal seam strength is determined at 23° C., and is more than 200 N/m (corresponding to 3 N/15 mm of film width). Seal seam strength of 275 N/m (corresponding to 4.125 N/15 mm of film width) is cited for a sealable layer of thickness 3 μm. The biaxially oriented polyester film does not have the low mechanical strength demanded with the desired feel and with good formability.

EP-A-1 138 480 describes a heat-sealable polyester film with a base layer B, with a heat-sealable outer layer A, and with a further, non-sealable outer layer C. The minimum sealing temperature of the sealable outer layer A is at most 110° C. and its seal seam strength is at least 1.3 N/15 mm of film width. The topographies of the two outer layers A and C are characterized by certain features. The inventive film is particularly suitable for use in flexible packaging, and specifically and particularly for use on high-speed packaging machinery. The biaxially oriented polyester film does not have the low mechanical strength demanded with the desired feel and with good formability.

SUMMARY OF ADVANTAGEOUS EMBODIMENTS OF THE INVENTION

It was an object of the present invention to provide a biaxially oriented polyester film which features a reduced level of mechanical properties, in particular lower ultimate tensile strength and lower modulus of elasticity. It should eliminate the disadvantages of the films of the prior art and in particular feature the following preferred combinations of properties:

Its modulus of elasticity in both orientation directions (MD and TD) is smaller than or equal to 3000 N/mm$^2$.

Its ultimate tensile strength in both orientation directions (MD and TD) is smaller than or equal to 100 N/mm$^2$.

Its crystallinity is markedly less than that of PET, its planar orientation thus being from 0.03 to 0.12 and its density thus being smaller than or equal to 1.38 g/cm$^3$.

It can be produced cost-effectively. This means by way of example that its industrial production can use conventional stretching processes and machinery speeds up to 500 m/min.

It has been ensured that an amount of from about 5 to 60% by weight of the regrind arising can be reintroduced to the production process during production of the film, without any resultant significant adverse effect on the physical and optical properties of the film, but in particular its modulus of elasticity and its ultimate tensile strength.

(MD=longitudinal or machine direction; TD=transverse direction)

One preferred embodiment of the inventive film moreover has the following feature:

It is, on at least one side, heat-sealable with respect to itself and with respect to substrates comprised of, for example, APET, A/CPET, CPET or metals.

(APET=amorphous polyethylene terephthalate (PET);

CPET=crystalline PET)

The film moreover exhibits the desired good processing performance. In particular, it exhibits no tendency toward adhesion to rolls or to other mechanical parts, no blocking problems, and no longitudinal corrugations during winding. A customer roll can therefore be readily produced with very good winding quality using the film.

DETAILED DESCRIPTION OF ADVANTAGEOUS EMBODIMENTS OF THE INVENTION

The object is achieved via provision of a biaxially oriented polyester film having a base layer (B) which comprises at least 80% by weight of a polyester comprised of from 55 to 90 mol % of units deriving from at least two aromatic dicarboxylic acids and of from 5 to 45 mol % of units deriving from at least one aliphatic dicarboxylic acid, where the total of the dicarboxylic-acid-derived molar percentages is 100.

In the preferred embodiment, the film moreover also has a heat-sealable outer layer (A), and this heat-sealable outer layer (A) comprises a proportion by weight greater than or equal to 70% of a copolyester comprised of from 60 to 95 mol % of ethylene terephthalate and of from 40 to 5 mol % of ethylene isophthalate.

Proportion by weight (% by weight) is based on the total weight of the corresponding layer.

The term polyester here also means polyester mixtures and/or copolyesters, and the term copolyesters also means copolyester mixtures.

Accordingly, the film of the present invention can be comprised only of the base layer (B) which comprises the inventive polymer mixture. In this case, the film has a single-layer structure. In one preferred embodiment, the film has a structure of at least two layers and encompasses at least the base layer (B) and a heat-sealable outer layer (A). In another inventive embodiment, the film has a multilayer structure, for example a three-layer structure. It is then comprised by way of example of the inventive base layer (B), of the outer layer (A) applied on one of the sides of the base layer (B), and also of the outer layer (C) applied on the other side of the base layer (B). The layers (A) and (C) can be identical or different.

In the case of the preferred three-layer embodiment, the film is comprised of the base layer (B) of the heat-sealable outer layer (A), and of an outer layer (C) opposite to the heat-sealable outer layer (A) in an ABC layer structure. In the preferred embodiment, the outer layer (C) is not heat-sealable. The term not heat-sealable here means that its minimum sealing temperature is greater than 125° C. (with respect to itself). In another embodiment, the outer layer (C) is also heat-sealable. The copolyesters present therein are then preferably the same as, or comparable with, those in the outer layer (A).

Base Layer (B)

The base layer (B) comprises a proportion by weight greater than or equal to 80% of a polyester, the inventive polyester being comprised of units deriving from aliphatic and aromatic dicarboxylic acids. The amount present in the polyester of the units deriving from the aromatic dicarboxylic acids is from 55 to 95 mol %, preferably from 60 to 90 mol %, particularly preferably from 65 to 85 mol %. The amount present in the polyester of the units deriving from the aliphatic dicarboxylic acids is from 5 to 45 mol %, preferably from 10 to 40 mol %, particularly preferably from 15 to 35 mol %, the mol % data here always giving a total of 100%. The corresponding diol units here likewise always give a total of 100 mol %.

Preferred aliphatic dicarboxylic acids are pimelic acid, suberic acid, azelaic acid, sebacic acid, glutaric acid, and adipic acid. Particular preference is given to azelaic acid, sebacic acid, and adipic acid.

Preferred aromatic dicarboxylic acids are terephthalic acid, isophthalic acid, 5-sulfoisophthalic acid, and 2,6-naphthalenedicarboxylic acid. Particular preference is given to terephthalic acid and isophthalic acid.

Preferred diols are ethylene glycol, trimethylene glycol, butylene glycol, and neopentyl glycol.

The inventive polyester generally includes the following dicarboxylate moieties and alkylene moieties, based in each case on the total amount of dicarboxylate moieties and, respectively, total amount of alkylene moieties:

from 55 to 90 mol %, preferably from 60 to 90 mol %, and particularly preferably from 65 to 70 mol %, of dicarboxylate, selected from one or more dicarboxylate moieties from the group of terephthalate, isophthalate, and 5-sulfo-isophthalate, from 5 to 45 mol %, preferably from 8 to 40 mol %, and particularly preferably from 11 to 35 mol %, of azelate, from 0 to 50 mol %, preferably from 0 to 40 mol %, and particularly preferably from 0.2 to 30 mol %, of sebacate, from 0 to 50 mol %, preferably from 0 to 40 mol %, and particularly preferably from 0 to 30 mol % of adipate, more than 30 mol %, preferably more than 40 mol %, and particularly preferably more than 50 mol %, of ethylene groups, of propylene groups, or of butylene groups.

To the extent that the aromatic dicarboxylate moieties include isophthalate and/or 5-sulfoisophthalate, the molar proportions of these present are as follows from >0 to 25 mol %, preferably from 5 to 20 mol %, and particularly preferably from 10 to 20 mol %, of isophthalate, from >0 to 5 mol %, preferably from 1 to 4 mol %, and particularly preferably from 2 to 3 mol %, of 5-sulfoisophthalate.

From 0 to 10% by weight of the base layer (B) can be comprised of particles, of additives, of auxiliaries, and/or of other materials usually added in polyester film technology.

Outer Layers (A) and (C), and Intermediate Layers

In another inventive embodiment, the film has multilayer structure, for example two- or three-layer structure. In the case of a three-layer film, the film is then comprised by way of example of the inventive base layer (B), of the outer layer (A) applied on one side of the base layer (B), and of the outer layer (C) applied on the other side of the base layer (B). The layers (A) and (C) can be identical or different. The film can moreover have another layer structure, e.g. an outer layer (C) arranged on the base layer (B), or else intermediate layers, for example between the base layer (B) and the outer layer (C). Examples of typical film structures are then B (=monofilm) or BC or BZC, where (Z) is an intermediate layer and (C) is an outer layer, or else ABC or ABA.

The polymers that can be used for the outer layers and for the intermediate layers are in principle the same as those for the base layer (B). However, other materials can also be present in these layers, and then these layers are preferably comprised of a mixture of polymers, copolymers, or homopolymers. Preference is given by way of example to those mixtures or else copolymers which comprise ethylene isophthalate units and/or ethylene 2,6-naphthalate units, and/or ethylene terephthalate units.

Up to 10 mol % of the polymers can preferably be comprised of further comonomers.

It is particularly advantageous to use in the outer layer (C) and/or (A), a polyester copolymer based on isophthalic acid and terephthalic acid. In this case, the optical properties of the film are particularly good.

In this case, the outer layer (C) and/or (A) of the film comprises in essence a polyester copolymer which is comprised entirely or mainly of isophthalic acid units and of terephthalic acid units, and of ethylene glycol units. The remaining monomer units derive from other aliphatic, cycloaliphatic, or aromatic diols and, respectively, other dicarboxylic acids that can also occur in the base layer. The preferred copolyesters which provide the desired properties of the film (in particular the optical properties) are those comprised of terephthalate units and of isophthalate units, and of ethylene glycol units. The proportion of ethylene terephthalate is preferably from 40 to 97 mol %, the corresponding proportion of ethylene isophthalate being from 60 to 3 mol %.

In the preferred heat-sealable variant of the inventive film, the heat-sealable outer layer (A), which is preferably applied via coextrusion to the base layer B, in essence comprises a proportion by weight greater than or equal to 70% of a copolyester comprised of from 60 to 95 mol % of ethylene terephthalate and of from 40 to 5 mol % of ethylene isophthalate. Preference is given to copolyesters in which the proportion of ethylene terephthalate is from 65 to 90 mol % and the corresponding proportion of ethylene isophthalate is from 35 to 10 mol %, and great preference is given to polyesters in which the proportion of ethylene terephthalate is from 70 to 85 mol % and the corresponding proportion of ethylene isophthalate is from 30 to 15 mol %.

In another advantageous embodiment of the invention, the outer layers (A) and/or (C) of the film are preferably comprised of at least 55% by weight of thermoplastic polyester. Examples of those suitable for this are polyesters comprised of ethylene glycol and terephthalic acid (=polyethylene terephthalate, PET), of ethylene glycol and naphthalene-2,6-dicarboxylic acid (=polyethylene 2,6-naphthalate, PEN) of 1,4-bis-hydroxymethylcyclohexane and terephthalic acid (=poly-1,4-cyclohexanedimethylene terephthalate, PCDT), or else of ethylene glycol, naphthalene-2,6-dicarboxylic acid, and biphenyl-4,4'-dicarboxylic acid (=polyethylene 2,6-naphthalate bibenzoate, PENBB). Preference is given to polyesters comprised of at least 90 mol %, particularly preferably at least 95 mol %, of ethylene glycol units and terephthalic acid units, or of ethylene glycol units and naphthalene-2,6-dicarboxylic acid units. The remaining monomer units derive from other diols and, respectively, other dicarboxylic acids. It is also advantageously possible to use, for the outer layers (A) and (C) copolymers or mixtures or blends comprised of the homo- and/or copolymers mentioned.

These polyesters can also be present in the base layer (B).

In another preferred, multilayer embodiment, the selection of the film constitution and, respectively, the film structure is such that the glass transition temperature Tg of the polymers or of the polymeric mixture at least of one of the outer layers (A) and (C) is higher than the glass transition temperature of the polymers of the base layer (B). The glass transition temperature of the polymers for the outer layers (A) and (C) is preferably in the range from 50 to 100° C. The film here preferably has a 3-layer structure, i.e. ABC or ABA, particular preference being given to an ABA layer structure. The outer layers (A) are to be regarded as identical here within the limits of variations caused by the production process. This symmetrical film structure provides very good circumstances for fully satisfactory processing of the film. These films have practically no curl and also during production exhibit no adhesion or blocking to metallic rolls.

In the embodiment described above, therefore, the $T_g2$ value of the polyester film is above the $T_g2$ value of the base layer but below the $T_g2$ value of the two outer layers (A) and (C).

When the glass transition temperatures are determined by means of differential scanning calorimetry (DSC), the transitions of the layers cannot be distinguished.

By virtue of the crystallinity and the molecular stresses in the amorphous content of the specimens, glass transitions determined in the first heating procedure on biaxially oriented, heat-set films (hereinafter termed $T_g1$) are of relatively small dimension, distributed over a wide range of temperature, and shifted to higher temperatures. Particularly because of orientation effects, they are not suitable for characterization of a polymer. The resolution of DSC test equipment is often insufficient to record the glass transitions in the first heating procedure ($T_g1$) of the individual layers of the inventive film, these transitions being "blurred" and small, because of orientation and crystallinity. If the specimens are melted and then rapidly cooled again to below their glass transition temperature (quenched), the orientation effects are eliminated. On re-heating, glass transitions are then measured (here termed $T_g2$) which have higher intensity and are characteristic of the respective polymers. However, here again the glass transitions of the individual layers cannot be distinguished, because the layers mix on melting and the polyesters present therein enter into transesterification reactions with one another. However, it is fully sufficient to compare the $T_g2$ value of the entire coextruded film with the $T_g2$ value of the polymer used for the base layer and, respectively, the outer layers. In the inventive film, the $T_g2$ value of the coextruded film is higher than that of the base layer but below the $T_g2$ value of the two outer layers (A) and (C).

The thickness of the outer layers is preferably greater than 0.5 μm and is in particular in the range from 1 to 20 μm, and particularly preferably in the range from 1.5 to 10 μm.

The inventive polyester for the base layer (B) and the outer layers (A) and (C) can by way of example be prepared by the known transesterification process. This starts from dicarboxylic esters and diols, these being reacted with the conventional transesterification catalysts, such as zinc salts, calcium salts, lithium salts, and manganese salts. The intermediates are then polycondensed in the presence of well-known polycondensation catalysts, such as antimony trioxide or titanium salts. An equally effective preparation process uses direct esterification in the presence of polycondensation catalysts. This starts directly from the dicarboxylic acids and the diols. In the two abovementioned cases, the individual components have random distribution in the inventive polyester.

It has also proven advantageous to prepare the inventive polyester for the base layer (B) by one of the following two processes:

a) The aromatic polyester and the aliphatic polyester—both prepared by way of example by the processes described above—are melted in the desired ratio together, and mixed. This can take place either in a reaction vessel or in a single-screw extruder, but preferably in a twin-screw extruder. Immediately after melting, transesterification reactions begin between the polyesters involved. First, block copolymers are obtained, and, as reaction time increases—as a function of temperature and the mixing action of the agitator—the blocks become smaller, and a long reaction time gives a random copolymer. However, it is neither necessary nor always advantageous to wait until random distribution has been achieved, because the desired properties are also obtained with a block copolymer. The resultant copolymer is then extruded from a die and pelletized.

b) The aromatic polyester (component I) and the aliphatic polyester (component II)—both in turn prepared by way of example by the processes described above—are mixed in the form of pellets in the desired ratio and the mixture is introduced into the extruder for the base layer (B). Here, transesterification to give the copolymer takes place directly during production of the film. This process has the advantage of high cost-effectiveness. This process generally gives block copolymers where the block length depends on the extrusion temperature, the mixing action of the extruder, and the residence time in the melt. It is advantageous here for the inventive process if the extrusion temperature is above the melting point $T_M$ of the higher-melting-point polyester. The extrusion temperature is generally above the melting point of the higher-melting-point polyester by at least 5° C., preferably by from 5 to 50° C., in particular, however, by from 5 to 40° C. One preferred extrusion unit that can clearly be used for processing of the mixture comprised of components I and II is a twin-screw extruder. Another factor that may be mentioned is that good results can also be achieved with a single-screw extruder, this therefore being in principle a general method that can be used.

The base layer (B), and any outer and intermediate layers present, can also comprise conventional additives, e.g. stabilizers and antiblocking agents. They are advantageously added to the polymer or to the polymer mixture before melting begins. Examples of stabilizers used are phosphorus compounds, such as phosphoric acid or phosphoric esters.

Typical antiblocking agents (also termed pigments or fillers in this context) are inorganic and/or organic particles, e.g. calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc, or manganese salts of the dicarboxylic acids used, carbon black, titanium dioxide, kaolin, or crosslinked polystyrene particles or crosslinked acrylate particles.

Other additives that can be selected are mixtures of two or more different antiblocking agents or mixtures of antiblocking agents of the same constitution but different particle size. The particles can be added to the individual layers in conventional concentrations, e.g. in the form of glycolic dispersion during polycondensation, or by way of masterbatches during extrusion (or else in the form of "direct additive addition" [DAA] directly into the extruder during extrusion).

In the case of a single-layer structure (in which case the film is comprised only of the base layer (B)), the film preferably comprises a concentration of from 0.02 to 1% by weight of fillers, in particular a concentration of from 0.04 to 0.8% by weight of fillers, and particularly preferably a concentration of from 0.06 to 0.6% by weight of fillers, based on the weight of the film and, respectively, of the layer (B). (Detailed description of suitable fillers or antiblocking agents is found by way of example in EP-A-0 602 964).

If the concentration is less than 0.02% by weight, the film can block and then by way of example cannot be wound. If the concentration is, in contrast, more than 1% by weight, the film loses its high transparency and becomes cloudy. It cannot then be used by way of example as packaging film.

The outer layers, too, preferably comprise the filler concentrations cited for the base layer (B).

In another preferred embodiment of the invention, the proportion of filler in the outer layers (A or/and C) is preferably less than 0.6% by weight, preferably less than 0.5% by weight, and particularly preferably less than 0.4% by weight, based on the weight of the respective outer layer.

In one preferred embodiment of the invention, the proportion of filler in the heat-sealable outer layer (A) is from 0 to 0.4% by weight, preferably from 0 to 0.2% by weight, and particularly preferably from 0 to 0.1% by weight, based on the weight of the outer layer (A).

In another advantageous embodiment of the invention, the outer layer (C) comprises, for achievement of good winding and of good processability, a pigment in which the median diameter ($d_{50}$ value) is in the range from 2 to 5 µm, preferably from 2 to 4 µm. The outer layer (C) preferably has high content of inert, i.e. added, pigments in order to improve winding performance and processability. The concentration of the inert particles in the outer layer C is generally from 0.1 to 0.4% by weight, preferably from 0.14 to 0.35% by weight, and in the particularly preferred embodiment, it is from 0.16 to 0.30% by weight (based on the weight of the outer layer (C)), the concentration generally depending in essence on the optical properties to be achieved in the film.

The total thickness of the inventive polyester film can vary widely and depends on the intended use. It is mostly from 6 to 300 µm, preferably from 8 to 200 µm, particularly preferably from 10 to 100 µm, and in the case of outer layers applied here the proportion made up by the base layer (B) is preferably from 40 to 99% of the total thickness.

Process

The present invention also provides a process for production of the film. For production of the film, the polyester or the components of the polyester (component 1=aromatic polyester homopolymers or aromatic polyester copolymers or a mixture thereof, component 2=aliphatic polyester homopolymers or aliphatic polyester copolymers or a mixture thereof) are advantageously introduced directly into the extruder for the monofilm or, in the case of multilayer films, for the base layer (B). The materials can be extruded at from about 250 to 300° C. For reasons of process technology (mixing of the various polymers) it has proven particularly advantageous here to carry out extrusion of the mixture in a vented twin-screw extruder (although a single-screw extruder can also be used successfully in a less preferred variant).

For the purposes of the invention, it is also possible to prepare a terpolymer from the aliphatic and aromatic polyester units involved.

The polymers for any outer layers (C and/or A) present are advantageously introduced by way of further extruders to the (coextrusion) system. The melts are shaped in a coextrusion die to give flat melt films and their layers are mutually superposed. The multilayer film is then drawn off and solidified with the aid of a chill roll and, if appropriate, of further rolls.

According to the invention, the biaxial stretching process is preferably carried out sequentially. This process first stretches longitudinally (i.e. in machine direction MD) and then stretches transversely (i.e. perpendicularly to machine direction TD). The longitudinal stretching can be carried out by way of example with the aid of two rolls rotating at different speeds corresponding to the desired stretching ratio. An appropriate tenter frame is generally used for the transverse stretching process.

In another inventive embodiment, the stretching process is carried out with the aid of a simultaneous stretching method, e.g. LISIM or MESIM. However, the cost-effectiveness arising from the greater machinery widths and higher speeds of the sequential stretching processes conventionally used nowadays gives advantages over the simultaneous stretching process.

According to the invention, the film is stretched longitudinally (MD) in the temperature range from preferably 60° C. (heating temperature from 60 to 130° C., dependent on stretching ratio and on stretching process used) to 130° C. (stretching temperatures from 60 to 130° C., depending on the stretching ratio and on the stretching process used) and transversely (TD) in the temperature range from preferably 90 (start of stretching) to 140° C. (end of stretching).

The longitudinal stretching ratio is preferably greater than 2.5 and is in particular in the range from 3:1 to 5:1 and particularly preferably in the range from 3.2:1 to 4.9:1. The transverse stretching ratio is preferably greater than 3 and is preferably in the range from 3.2:1 to 5:1 and particularly preferably in the range from 3.3:1 to 4.8:1.

Prior to transverse stretching, one or both surfaces of the film can be in-line coated by the known processes. In-line coating can by way of example serve for improved adhesion of a metal layer or of any printing ink subsequently to be applied, or else for improvement of antistatic performance or of processing performance.

In the heat-setting which follows, the film is kept for a period of from about 0.1 to 10 s at a temperature of from about 150 to 250° C. The film is then wound conventionally.

After biaxial stretching, it is preferable that one of the two surfaces of the film is corona- or flame-treated by one of the known methods. The intensity of treatment is generally in the range above 50 mN/m.

Preferred Film Properties

Modulus of elasticity is $\leq 3000$ N/mm$^2$ in both orientation directions (MD and TD). In one preferred embodiment, modulus of elasticity is $\leq 2200$ N/mm$^2$. In one particularly preferred embodiment, modulus of elasticity is $\leq 1500$ N/mm$^2$.

Ultimate tensile strength is $\leq 100$ N/mm$^2$ in both orientation directions. In one preferred embodiment, ultimate tensile strength is $\leq 80$ N/mm$^2$. In one particularly preferred embodiment, ultimate tensile strength is $\leq 60$ N/mm$^2$.

Crystallinity here has been markedly reduced in comparison with standard PET, planar orientation $\Delta p$ therefore being from 0.03 to 0.12 and density therefore being $\leq 1.38$ g/cm$^3$. In one preferred embodiment, planar orientation $\Delta p$ is from 0.04 to 0.11, density preferably being $\leq 1.37$ g/cm$^3$.

The gloss of both surfaces of the film is greater than 100 at an angle of incidence of 20°. In one particularly preferred embodiment, gloss of the surfaces of the film is more than 120.

Haze of the film is smaller than 20%. In one particularly preferred embodiment, haze of the film is less than 15%.

In the case of the heat-sealable film, the minimum sealing temperature of the heat-sealable outer layer (A) is smaller than 125° C. (with respect to itself).

It has been ensured that, during production of the film, an amount which is preferably from 5 to 60% by weight, in particular from 10 to 50% by weight, based in each case on the total weight of the film, of cut material arising directly in the factory during film production can be reused for film production without any significant resultant adverse effect on the physical properties of the film.

By way of example, the inventive film has excellent suitability as backing layer in a transdermal adhesive plaster. The low mechanical strengths of the film give it an excellent soft feel, giving the user markedly improved wear comfort when comparison is made with PET, which is mostly used nowadays and which is stiffer. The film also has excellent suitability for packaging of foods and other consumable items, for metalizing or vacuum-coating with ceramic substances, or—in the case of the heat-sealable variant—as protective film for sheet metal, to which it is then by way of example heat-sealed.

The table below (table 1) collates the most important preferred properties of the film.

TABLE 1

| Film or base layer | Preferred | Particularly preferred | Very particularly preferred | Unit | Test method |
|---|---|---|---|---|---|
| Proportion of units in inventive polyester comprised of aromatic dicarboxylic acids | 55-90 | 60-90 | 65-85 | mol % | |

TABLE 1-continued

| Film or base layer | Preferred | Particularly preferred | Very particularly preferred | Unit | Test method |
|---|---|---|---|---|---|
| Proportion of units in inventive polyester comprised of aliphatic dicarboxylic acids | 5-45 | 10-40 | 15-35 | mol % | |
| Filler concentration in base layer (B) of single-layer film | 0.02-1 | 0.04-0.8 | 0.06-0.6 | % by wt. | |
| Filler concentration in outer layers (A) and/or (C) of multilayer, non-heat-sealable film | 0.02-1 | 0.04-0.8 | 0.06-0.6 | % by wt. | |
| Filler concentration in outer layer (C) of multilayer heat-sealable film | 0.1-0.4 | 0.14-0.35 | 0.16-0.3 | % by wt. | |
| Film properties | | | | | |
| Modulus of elasticity of film in both orientation directions | ≦3000 | ≦2200 | ≦1500 | N/mm² | DIN 53 457 |
| Ultimate tensile strength of film in both orientation directions | ≦100 | ≦80 | ≦60 | N/mm² | DIN 53 455 |
| Density | ≦1.38 | ≦1.37 | ≦1.36 | g/cm³ | ASTM D1505-68 method C |
| Δp | 0.03-0.12 | 0.04-0.11 | 0.05-0.10 | | |
| Film gloss (20° angle of measurement) | ≧100 | ≧120 | ≧140 | — | DIN 67 530 |
| Film haze | ≦20 | ≦15 | ≦10 | % | ASTM D1003-52 |
| Film thickness | 6-300 | 8-200 | 10-100 | μm | |

The following test methods are used to characterize the raw materials and the films:
DIN = Deutsches Institut für Normung [German Institute for Standardization]
ASTM = American Society for Testing and Materials (1) Haze Film haze is determined to ASTM D1003-52.

(2) SV (Standard Viscosity)

Standard viscosity SV (DCA) is measured at 25° C. in dichloroacetic acid by a method based on DIN 53726. Intrinsic viscosity (IV) is calculated from standard viscosity as follows:

$$IV[\eta]=6.907\cdot10^{-4}SV(DCA)+0.063096 \text{ [dl/g]}$$

(3) Gloss

Gloss is determined to DIN 67 530. Reflectance is measured, this being an optical value characteristic of a film surface. Using a method based on the standards ASTM D523-78 and ISO 2813, the angle of incidence is set at 20°. A beam of light hits the flat test surface at the set angle of incidence and is reflected or scattered by the surface. A proportional electrical variable is displayed, representing light rays hitting the photoelectronic detector. The value measured is dimensionless, and has to be stated with the angle of incidence. The measured values cited in the examples for gloss are measured at an angle of incidence of 20°.

(4) Modulus of Elasticity

Modulus of elasticity is determined to DIN 53 457 or ASTM 882.

(5) Ultimate Tensile Strength, Tensile Strain at Break

Ultimate tensile strength and tensile strain at break are determined to DIN 53 455.

(6) Planar Orientation Δp and Refractive Index

Planar orientation is determined by measuring refractive indices with an Abbe refractometer (in which connection see by way of example EP-A-1 138 480 A2, which gives the complete test specification).

(7) Glass Transition Temperature

Glass transition temperatures $T_g1$ and $T_g2$ were determined from film specimens with the aid of DSC (differential scanning calorimetry). A DSC 1090 from DuPont was used. The heating rate was 20 K/min and the specimen weight was about 12 mg. In the first heating procedure, the glass transition temperature $T_g1$ was determined. The samples often gave an enthalpy relaxation (a peak) at the beginning of the stepped glass transition. The temperature taken as $T_g1$ was that at which the stepped change in heat capacity—without reference to the peak-shaped enthalpy relaxation—achieved half of its height in the first heating procedure. In all cases there was only a single glass transition state in the thermogram in the first heating procedure. It is possible that the peak-shaped enthalpy relaxations occluded the fine structure of the transition, or that the resolution of the equipment was insufficient to resolve the small, "blurred" transitions of orientated, crystalline specimens. In order to eliminate the heat histories of the specimens, they were kept at 300° C. for 5 minutes after heating and then quenched with liquid nitrogen. The temperature for the glass transition $T_g2$ was taken from the thermogram for the second heating procedure, as the temperature at half of the height of the transition.

(8) Measurement of Median Particle Diameter $d_{50}$

Median diameter $d_{50}$ is determined by means of a laser on a Mastersizer (Malvern Instruments, GB), using the standard method (examples of other measurement equipment being Horiba LA 500 (Horiba Ltd., JP) or Helos (Sympathec GmbH, DE), which use the same measurement principle). For the test, the specimens are placed with water in a cell and this is then placed in the measurement equipment. The measurement procedure is automatic and also includes the mathematical determination of $d_{50}$. $d_{50}$ here is defined as determined as follows from the (relative) cumulative particle size distribution curve: the desired $d_{50}$ is directly given on the abscissa axis by the intersection of the 50% ordinate value with the cumulative curve.

(9) Seal Seam Strength with Respect to Itself (=FIN Sealing)

To determine seal seam strength, two strips of film of width 15 mm are mutually superposed and sealed at 130° C. with sealing time of 0.5 s and sealing pressure of 2 bar (equipment: Brugger NDS, DE, single-side heated sealing jaw). Seal seam strength was determined by the T-peel method=2·90°.

(10) Determination of Minimum Sealing Temperature with Respect to Itself

Using HSG/ET sealing equipment from Brugger, DE, heat-sealed specimens (seal seam 20 mm×100 mm) are produced by sealing the film at various temperatures with the aid of two heated sealing jaws with sealing pressure of 2 bar and sealing time of 0.5 s. Test strips of width 15 mm were cut from the sealed specimens. T-seal seam strength is measured as in determination of seal seam strength. Minimum sealing temperature is the temperature at which seal seam strength of at least 0.5 N/15 mm is achieved.

EXAMPLES

The examples below illustrate the invention. Each of the products used (trademarks and producer) is cited only once and this citation then applies to the subsequent examples.

Example 1

Chips comprised of component I, component II, and component III are introduced in a mixing ratio of 40:50:10 into the extruder (twin-screw extruder with two vents), and a single-layer film is produced by extrusion. The film was oriented longitudinally and transversely, giving a transparent film whose total thickness was 20 µm.

| Film structure | |
| --- | --- |
| 40% by weight | Component I: Polyethylene terephthalate 4023 from Invista, Germany, whose SV value is 800 (prepared by way of the transesterification process using Mn as transesterification catalyst; polycondensation catalyst based on antimony) |
| 50% by weight | Component II: Copolymer, containing 40 mol % of ethylene azelate, 50 mol % of ethylene terephthalate, and 10 mol % of ethylene isophthalate, whose SV value is 1000. The glass transition temperature of this component is about 0° C. |
| 10% by weight | Component III: Polyester (= polyethylene terephthalate) from Invista whose SV value is 800, comprised of 99% by weight of polyethylene terephthalate 4023 from Invista and 1.0% by weight of silica particles (Sylysia ® 320 from Fuji, Japan) whose $d_{50}$ value is 2.5 µm |

The production conditions in the individual steps of the process are as follows:

| | | | |
| --- | --- | --- | --- |
| Extrusion | Max. temperature | | 260° C. |
| | Temperature of take-off roll | | 20° C. |
| Longitudinal stretching | Longitudinal stretching ratio | $\lambda_{MDO}$ | 4.0 |
| | Stretching temperature | | 80° C. |
| | Heating temperature | 1st roll | 60° C. |
| | | last roll | 80° C. |
| Transverse stretching | Stretching temperature | Start | 100° C. |
| | | End | 125° C. |
| | Transverse stretching ratio | | 3.8 |
| Setting | Temperature | | 200° C. |
| | Duration | | 3 s |

The film had the low mechanical strength demanded and the low haze demanded. Both surfaces of the film had the high gloss demanded. Furthermore, the film could be produced very efficiently, i.e. without break-offs, and moreover exhibited the desired processing performance (inter alia good winding quality, e.g. no blocking points, no longitudinal corrugations, no high edges).

Example 2

In this example, the mixing ratios of the components were changed, and the process conditions were adjusted appropriately. Chips comprised of component I, component II, and component III were introduced in a mixing ratio of 50:40:10 into the extruder (twin-screw extruder), and a single-layer film is produced by extrusion. The film was oriented longitudinally and transversely, giving a transparent film whose total thickness was 20 µm.

| Film structure | |
| --- | --- |
| 50% by weight of | component I |
| 40% by weight of | component II |
| 10% by weight of | component III |

The production conditions in the individual steps of the process are as follows:

| | | | |
|---|---|---|---|
| Extrusion | Max. temperature | | 260° C. |
| | Temperature of take-off roll | | 20° C. |
| Longitudinal stretching | Longitudinal stretching ratio | $\lambda_{MDO}$ | 4.2 |
| | Stretching temperature | | 85° C. |
| | Heating temperature | 1st roll | 60° C. |
| | | last roll | 75° C. |
| Transverse stretching | Stretching temperature | Start | 100° C. |
| | | End | 125° C. |
| | Transverse stretching ratio | | 3.8 |
| Setting | Temperature | | 205° C. |
| | Duration | | 3 s |

The surfaces of the film had the high gloss demanded, and the film had the low haze demanded and the low mechanical strength demanded. Furthermore, the film could be produced very efficiently, i.e. without break-offs, and moreover exhibited the desired processing performance (inter alia good winding quality, e.g. no blocking points, no longitudinal corrugations, no high edges).

Example 3

In this example, again it was only the mixing ratios of the components that were changed, the process conditions being adjusted appropriately. Chips comprised of component I, component II, and component III were introduced in a mixing ratio of 60:30:10 into the extruder (twin-screw extruder), and a single-layer film is produced by extrusion. The film was oriented longitudinally and transversely, giving a transparent film whose total thickness was 20 μm.

| Film structure | |
|---|---|
| 60% by weight of | component I |
| 30% by weight of | component II |
| 10% by weight of | component III |

The production conditions in the individual steps of the process are as follows:

| | | | |
|---|---|---|---|
| Extrusion | Max. temperature | | 270° C. |
| | Temperature of take-off roll | | 22° C. |
| Longitudinal stretching | Longitudinal stretching ratio | $\lambda_{MDO}$ | 4.0 |
| | Stretching temperature | | 90° C. |
| | Heating temperature | 1st roll | 60° C. |
| | | last roll | 80° C. |
| Transverse stretching | Stretching temperature | Start | 110° C. |
| | | End | 130° C. |
| | Transverse stretching ratio | | 3.8 |
| Setting | Temperature | | 210° C. |
| | Duration | | 3 s |

The surfaces of the film had the high gloss demanded, and the film had the low haze demanded and the low mechanical strength demanded. Furthermore, the film could be produced very efficiently, i.e. without break-offs, and moreover exhibited the desired processing performance (inter alia good winding quality, e.g. no blocking points, no longitudinal corrugations, no high edges).

Example 4

Example 1 was now modified by producing a coextruded film with ABA film structure. No particles were now used in the base layer (B), and these were added exclusively to the two coex layers comprised of PET homopolymer. The base layer (B) was now comprised of components I and components II, these having been added in a mixing ratio of 50:50 to the twin-screw extruder. The constitution of components I and components II was as in the preceding examples.

| Film structure | |
|---|---|
| Base layer (B): | thickness 18 μm |
| 50% by weight of | component I |
| 50% by weight of | component II |
| Coex layers (A): | each of thickness 1 μm |
| 90% by weight of | component I |
| 10% by weight of | component III |

The production conditions in the individual steps of the process are as follows:

| | | | |
|---|---|---|---|
| Extrusion | Max. temperature | | 260° C. |
| | Temperature of take-off roll | | 20° C. |
| Longitudinal stretching | Longitudinal stretching ratio | $\lambda_{MDO}$ | 4.0 |
| | Stretching temperature | | 80° C. |
| | Heating temperature | 1st roll | 60° C. |
| | | last roll | 80° C. |
| Transverse stretching | Stretching temperature | Start | 100° C. |
| | | End | 125° C. |
| | Transverse stretching ratio | | 3.8 |
| Setting | Temperature | | 200° C. |
| | Duration | | 3 s |

The surfaces of the film had the high gloss demanded, and the film had the low haze demanded and the low mechanical strength demanded. Furthermore, the film could be produced very efficiently, i.e. without break-offs, and without adhering to rolls or blocking, and moreover exhibited the desired processing performance (inter alia good winding quality, e.g. no blocking points, no longitudinal corrugations, no high edges).

Example 5

Example 4 was modified by producing a coextruded film with ABA film structure, the formulation of the base layer (B) now having been changed.

| Film structure | |
|---|---|
| Base layer (B): | thickness 18 μm |
| 70% by weight of | component I |
| 30% by weight of | component II |
| Coex layers (A): | each of thickness 1 μm |
| 90% by weight of | component I |
| 10% by weight of | component III |

The production conditions in the individual steps of the process are as described in example 4.

Example 6

Example 5 was modified by producing a coextruded film with ABA film structure, again changing the formulation of the base layer (B).

| | Film structure |
|---|---|
| Base layer (B): | thickness 18 μm |
| 60% by weight of | component I |
| 40% by weight of | component II: copolyester comprised of a random copolymer comprised of 100% of 1,4-butanediol units, 65% of adipic acid units, 32% of terephthalic acid units, and 3% of sulfoisophthalic units whose SV value is 870 |
| Coex layers (A): | each of thickness 1 μm |
| 90% by weight of | component I |
| 10% by weight of | component III |

The production conditions in the individual steps of the process are as described in example 4.

Example 7 (Heat-Sealable Film)

Chips comprised of component I and component II are introduced in a mixing ratio of 50:50 into the extruder (twin-screw extruder with two vents) for the base layer (B). Chips comprised of a component IV are introduced into an extruder (twin-screw extruder with two vents) for the heat-sealable outer layer (A). Alongside this, chips comprised of component I and of a further component V are introduced in a mixing ratio of 90:10 into the extruder (twin-screw extruder with two vents) for the outer layer (C). A three-layer unoriented film of ABC structure is produced by coextrusion. The film is oriented longitudinally and transversely, giving a transparent biaxially oriented film whose total thickness is 20 μm.

| Film structure for base layer (B) | |
|---|---|
| 50% by weight of | component I |
| 50% by weight of | component II |
| Outer layer (A) | |
| 100.0% by weight | of component IV: copolyester having 78 mol % of ethylene terephthalate | and 22 mol % of ethylene isophthalate (prepared by way of the transesterification process using Mn as transesterification catalyst, Mn concentration: 100 ppm).

| Outer layer (C) | |
|---|---|
| 90% by weight of | component I |
| 10% by weight of | component III |

The production conditions in the individual steps of the process are as follows:

| | | | |
|---|---|---|---|
| Extrusion | Max. temperature | | 260° C. |
| | Temperature of take-off roll | | 20° C. |
| Longitudinal stretching | Longitudinal stretching ratio | $\lambda_{MDO}$ | 4.0 |
| | Stretching temperature | | 80° C. |
| | Heating temperature | 1st roll | 60° C. |
| | | last roll | 80° C. |
| Transverse stretching | Stretching temperature | Start | 100° C. |
| | | End | 125° C. |
| | Transverse stretching ratio | | 3.8 |
| Setting | Temperature | | 200° C. |
| | Duration | | 3 s |

The film has the low mechanical strength demanded, the heat-sealability demanded, and the low haze demanded. Both surfaces of the film have the high gloss demanded. Furthermore, the film can be produced very efficiently, i.e. without break-offs, and without adhering to rolls or blocking, and moreover exhibits the desired processing performance (inter alia good winding quality, e.g. no blocking points, no longitudinal corrugations, no high edges).

Comparative Example 1

A film was produced corresponding to example 1 of EP-A-415 383. The planar orientation of said film is too high, and the density of the film, in particular the mechanical properties, are not within the inventive range. Furthermore, the stiffness of the film was too high, giving it a hard, unpleasant feel.

The properties and the structure of the films produced in the examples and in the comparative example are collated in table 2.

TABLE 2

| | Film structure | Thickness [μm] | 20° gloss | Haze [%] | Density [g/cm³] | Δp | Modulus of elasticity [N/mm²] | | Ultimate tensile strength [N/mm²] | |
|---|---|---|---|---|---|---|---|---|---|---|
| | | | | | | | MD | TD | MD | TD |
| Example 1 | mono | 20 | 143 | 19 | 1.34 | 0.063 | 1033 | 1220 | 52 | 58 |
| Example 2 | mono | 20 | 174 | 16 | 1.35 | 0.071 | 1385 | 1649 | 55 | 62 |
| Example 3 | mono | 20 | 181 | 10 | 1.36 | 0.076 | 1647 | 2004 | 58 | 64 |
| Example 4 | ABA | 20 (=1/18/1) | 160 | 16 | 1.34 | 0.064 | 1050 | 1239 | 53 | 60 |
| Example 5 | ABA | 20 (=1/18/1) | 181 | 10 | 1.36 | 0.076 | 1647 | 2004 | 58 | 64 |
| Example 6 | ABA | 20 (=1/18/1) | 176 | 12 | 1.35 | 0.074 | 1567 | 1987 | 55 | 66 |
| Example 7 | ABC | 20 (=2/17/1) | 160 | 16 | 1.34 | 0.064 | 1050 | 1239 | 53 | 60 |
| Comparative example 1 | mono | 20 | | | 1.38 | 0.14 | | | | |

The invention claimed is:

1. A biaxially oriented polyester film having a base layer (B) which comprises at least 80% by weight of a polyester comprised of from 55 to 90 mol % of units derived from at least two aromatic dicarboxylic acids and of from 10 to 45 mol % of units derived from at least one aliphatic dicarboxylic acid, where the total of the dicarboxylic-acid-derived molar percentages is 100, wherein said film exhibits a modulus of elasticity of less than or equal to 3000 N/mm2 and an ultimate tensile strength in both orientation directions of less than or equal to 80 N/mm$^2$.

2. The polyester film as claimed in claim 1, wherein the base layer (B) comprises, as aliphatic dicarboxylic acid, pimelic acid, suberic acid, azelaic acid, sebacic acid, glutaric acid, or adipic acid.

3. The polyester film as claimed in claim 1, wherein the base layer (B) comprises, as aliphatic dicarboxylic acid, azelaic acid, sebacic acid, or adipic acid.

4. The polyester film as claimed in claim 1, wherein the base layer (B) comprises, as aromatic dicarboxylic acid, terephthalic acid, isophthalic acid, 5-sulfoisophthalic acid, or 2,6-naphthalenedicarboxylic acid.

5. The polyester film as claimed in claim 1, wherein the base layer (B) comprises, as aromatic dicarboxylic acid, terephthalic acid.

6. The polyester film as claimed in claim 1, wherein the base layer (B) comprises polyethylene terephthalate.

7. The polyester film as claimed in claim 1, wherein said film is a multilayer film having at least one base layer (B) and one outer layer (A).

8. The polyester film as claimed in claim 7, wherein the outer layer (A) is heat-sealable and comprises at least 70% by weight of a copolyester comprised of from 60 to 95 mol % of ethylene terephthalate and from 40 to 5 mol % of ethylene isophthalate.

9. The polyester film as claimed in claim 8, wherein the heat-sealable outer layer (A) comprises no antiblocking agents.

10. The polyester film as claimed in claim 8, wherein the minimum sealing temperature of the heat-sealable outer layer (A) with respect to itself is smaller than 125° C.

11. The polyester film as claimed in claim 1, wherein said film is a three-layer film having an ABC layer structure, where the outer layers (A) and (C) comprise identical or different polymers.

12. The polyester film as claimed in claim 11, which has an ABA layer structure.

13. The polyester film as claimed in claim 11, wherein said film has the same aromatic dicarboxylic acid units in the outer layers (A) and (C) as in the base layer (B).

14. The polyester film as claimed in claim 11, wherein the outer layers (A) and (C) comprise no aliphatic dicarboxylic acid units.

15. The polyester film as claimed in claim 11, wherein the outer layers (A) and (C) polymer consists essentially of polyethylene terephthalate or a copolyester of from 60 to 95 mol % ethylene terephthalate and from 40 to 5 mol % of ethylene isophthalate.

16. The polyester film as claimed in claim 11, wherein the outer layer (C) comprises from 0.1 to 0.4% by weight of antiblocking agents.

17. The polyester film as claimed in claim 11, whose $T_g2$ value is above the $T_g2$ value of the base layer (B), but below the $T_g2$ value of the outer layers (A) and (C).

18. The polyester film as claimed in claim 11, wherein the outer layers (A) and (C) comprise from 0.02 to 1% by weight of antiblocking agents.

19. The polyester film as claimed in claim 1, wherein the base layer (B) comprises from 0.02 to 1% by weight of antiblocking agents.

20. The polyester film as claimed in claim 1, whose density is $\leq 1.38$ g/cm$^3$ and whose planar orientation is from 0.03 to 0.12.

21. A process for production of a polyester film as claimed in claim 1, said process comprising the following steps:
a) producing a single- or multilayer film via extrusion or coextrusion,
b) biaxial stretching of the film, and
c) heat-setting of the stretched film.

22. Adhesive plasters and/or packaging material for foods and other consumable items comprising polyester film as claimed in claim 1.

23. Protective film comprising polyester film as claimed in claim 8.

* * * * *